United States Patent [19]

Phillips et al.

[11] 3,983,746
[45] Oct. 5, 1976

[54] ROAD ROUGHNESS METER

[75] Inventors: Ross A. Phillips, Morgantown; Benjamin C. Thorner, Star City, both of W. Va.

[73] Assignee: The United States of America as represented by the Secretary of Agriculture, Washington, D.C.

[22] Filed: Aug. 14, 1975

[21] Appl. No.: 604,858

[52] U.S. Cl. ........................................ 73/105; 346/8
[51] Int. Cl.$^2$ ............................................ G01B 5/28
[58] Field of Search ................ 73/105, 146; 33/333, 33/354; 346/7, 8

[56] References Cited
UNITED STATES PATENTS

| | | | |
|---|---|---|---|
| 1,843,959 | 2/1932 | Sperry | 346/7 X |
| 2,946,644 | 7/1960 | Henry | 73/146 UX |
| 3,069,904 | 12/1962 | Henry | 73/146 |
| 3,151,235 | 9/1964 | Greenshields | 73/105 X |
| 3,266,302 | 8/1966 | Spangler et al. | 73/105 |
| 3,353,404 | 11/1967 | Swift | 73/146 |
| 3,459,038 | 8/1969 | Swift | 73/146 |
| 3,525,257 | 8/1970 | Mays | 73/146 |
| 3,888,118 | 6/1975 | Nims | 73/105 |

FOREIGN PATENTS OR APPLICATIONS

| | | | |
|---|---|---|---|
| 1,036,521 | 4/1953 | France | 346/8 |

*Primary Examiner*—Richard C. Queisser
*Assistant Examiner*—Joseph W. Roskos
*Attorney, Agent, or Firm*—M. Howard Silverstein; David G. McConnell

[57] ABSTRACT

This invention detects, indicates and records road surface deviations in the normally-traveled vehicle tracks. Surface deviations detectable range from less than one inch in height to the largest height negotiable by the vehicle carrying the instrument. Final measurements are indicated from a mean surface, and with proper calibration numerical values may be established to give a meaningful quantitative description of the roughness of a given section of road.

Description of the surface roughness is expressed by two linear dimensions: one is the height of the encountered deviation; the other is the distance between major deviations. For analysis of the data obtained, the first dimension, the height of the deviation, is used as recorded, and the second dimension is inverted to give frequency of deviation.

Measurements are made by maintaining a predetermined reference plane with a gyroscope and sensing the carrying vehicle's roll and pitch. The data can be displayed on a dial or recorded on a chart; chart recordings, when properly calibrated, indicate both amplitude and spacing of road surface deviations.

2 Claims, 4 Drawing Figures

INSTRUMENT LOCATION IN VEHICLE

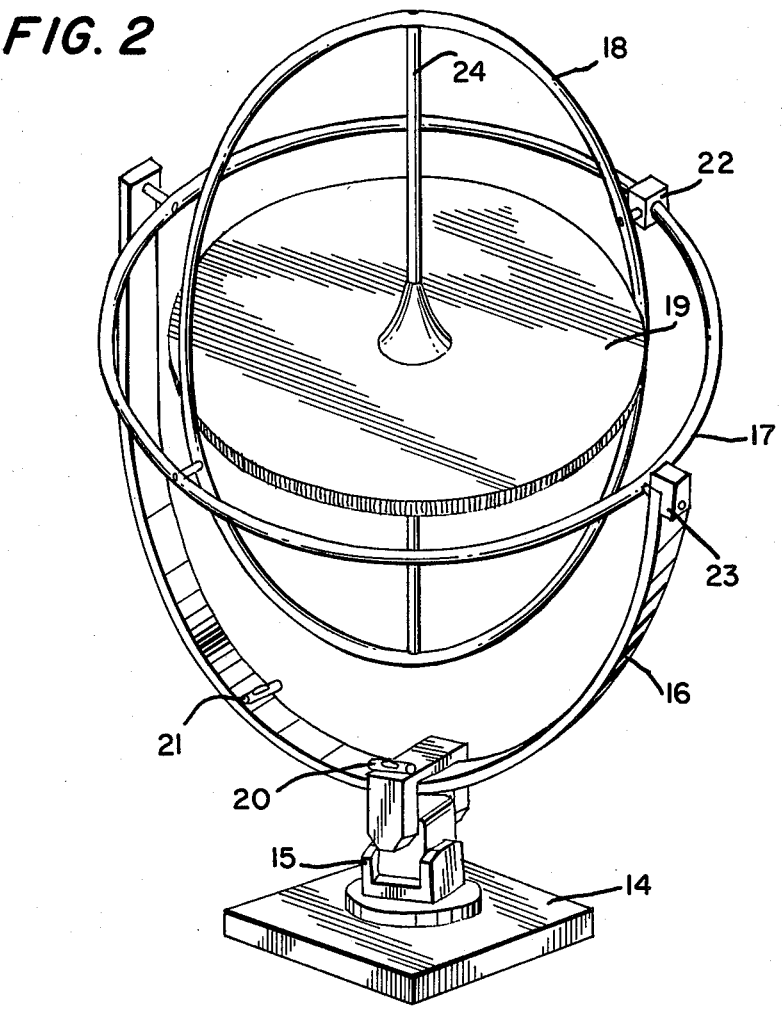

ROAD ROUGHNESS METER

A non-exclusive, irrevocable, royalty-free license in the invention herein described, throughout the world for all purposes of the United States Government, with the power to grant sub-licenses for such purposes, is hereby granted to the Government of the United States of America.

BACKGROUND

1. Field of the Invention

This invention provides a means for generating an objective, quantitative evaluation of road surfaces. The data generated are applicable to road design by providing quantitative data from which a numerical analysis of past, current, or proposed road projects can be made. These data also have significance for those responsible for road maintenance.

2. Prior Art

Accelerometers have been used by pavement engineers to determine pavement roughness. These instruments operate at a fixed speed (frequently 25 miles per hour) and vibrations from the road surface energize a recorder to accumulate the fluctuations. The summation of these fluctuations is expressed on a chart recording in two linear dimensions such as inches per mile with the inches being the summation of all the vertical deviations over the mile distance traveled. Although this type of instrument has some value, it is suitable primarily for relatively smooth surfaces. Because of the summary nature of the vertical measurement, all detail of the road surface is lost; a very rough road for a short distance followed by a smooth road could give the same reading as a medium rough road for the entire length, or if the right track would drop while the left track raised, the result could record as quite smooth. Obviously the more severe the variations in the road surface the less satisfactory the data generated by this instrument, and on unpaved roads such an instrument would be practically useless. One of the objects of this invention is to provide an instrument capable of measuring road surface roughness with deviations from less than one inch to those as large as the instrument carrier is capable of traversing; with a four-wheel drive vehicle, extremely large surface deviations are measurable. Another object of this invention is to provide an actual record of the surface deviations rather than an average over some traveled distance; thus each deviation within the sensitivity of the instrument is recorded as well as its distance from a known, selected point. With a chart from this invention, a complete, objective, quantitative record is obtained whereas the accelerometers described depended on a subjective evaluation of an observer to complement the recorded data; since the record contained merely a summation of all the vertical deviations, an independent evaluation of the road surface was a necessary supplement. For design or maintenance purposes, but particularly design, such a record is of minimal value because it is not keyed to any specific road section within the base distance traveled. A further advantage of this invention is that relatively unskilled operators can gather the data and an engineer or other skilled technician or professional can obtain a complete evaluation of the road largely from the data without having to spend inordinate amounts of time in the field.

A much more primitive method of determining surface roughness is determination by vertical measurements from an arbitrary plane; these measurements are obtained with a rod and level. A rutting index for unpaved roads has been developed from this method. The rutting index is vertical measurements in tenths of a foot from a mean elevation taken at one foot intervals across the road and divided by the width in feet of the measured road surface. This method suffers from the handicap of being very slow if a long stretch of road surface is involved. Additionally, it only gives quantitative data for the particular points measured and is void of such data for all points in between. This invention has the advantage of providing a continuous record of surface deviations over the entire length measured. It has the additional advantage of covering the desired surface at a much more rapid rate.

An analytical method for examining vehicle capability over extremely rough terrain was developed by Bekker of the Land Locomotion Laboratory, Ordnance Tank Automotive Command, Detroit, Michigan. This method uses a simple harmonic wave form with an amplitude close to the height of the vehicle that was theoretically analyzed. Analysis yielded "go" or "no go" conditions for each vehicle examined. This analysis does not correlate closely to actual conditions on a specific road section unless quantitative data of that road surface are first supplied, a function this invention provides. Additionally, the Bekker method provides no grading between passable and impassable.

SUMMARY OF THE INVENTION

This invention is designed to measure, indicate and/or record road surface roughness. Pickup of road deviations is transmitted from the wheels of the instrument carrier to the sensing elements which evaluate the data and either display it on dials or record it on a chart or both. Measurements are referenced to a plane maintained by a gyroscope. When one of the vehicle wheels rises or falls from the average elevation of operation, the vehicle will either pitch or roll or both. Sensing elements attached to the gimbles of the gyroscope send signals of the movement, pitch or roll or both, to an adjustable amplifier which increases the volume of the signal to operate an indicator or recorder. If the indicator and recorder are sufficiently sensitive and adjustable, the amplifier is unnecessary, but adjustment at one point is necessary for calibration.

BRIEF DESCRIPTION OF THE DRAWINGS

FIG. I is a view of the instrument located in a vehicle;

FIG. II is a view of the gyroscope and position sensing devices; and

Figure 1A:
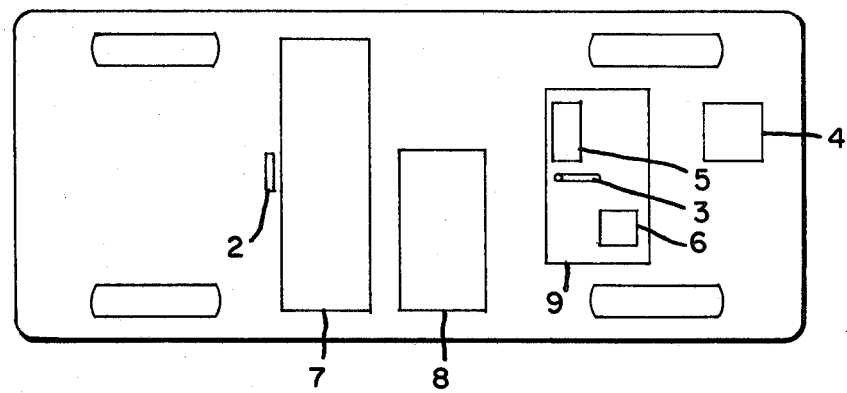
Figure 1B:
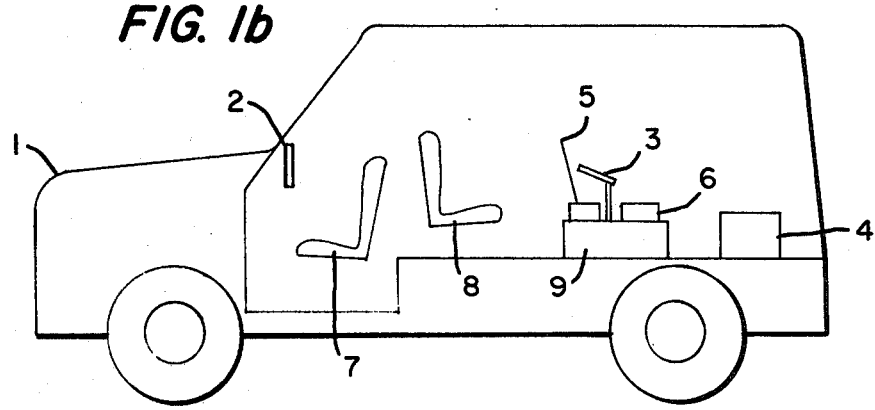
Figure 3:
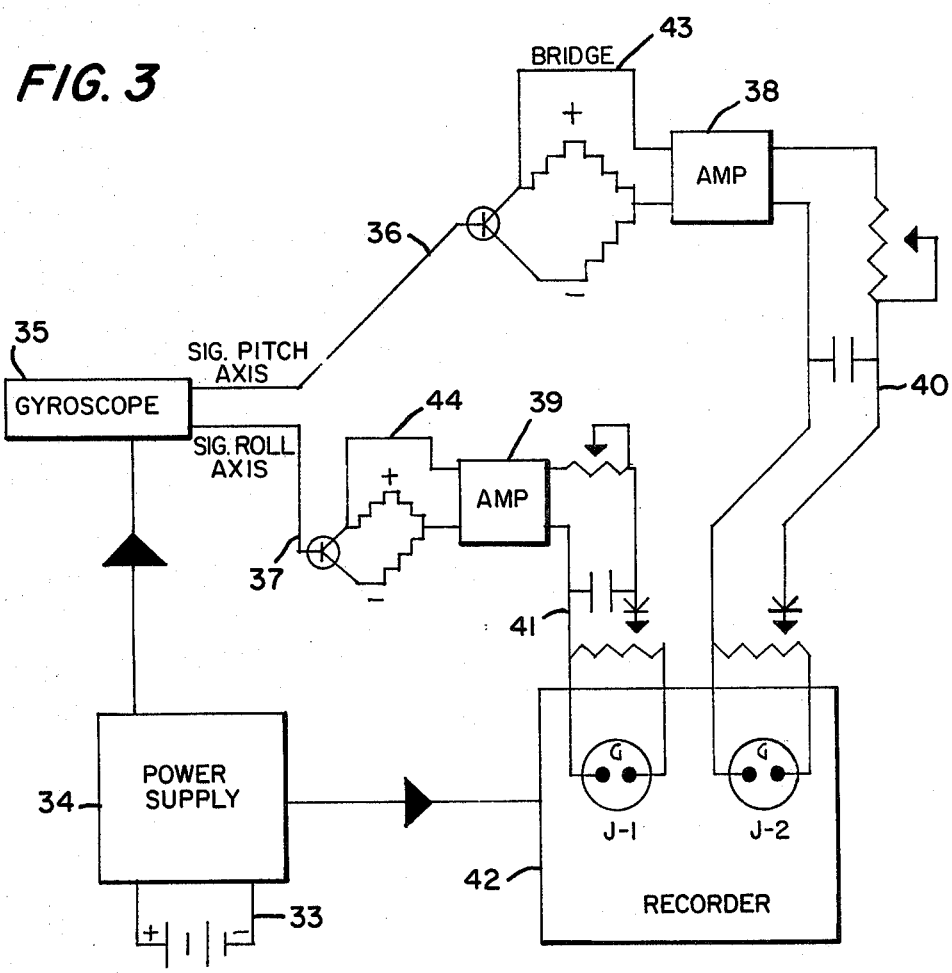

FIG. III is an illustration of the electrical assembly of the invention.

The components of the invention are indicated in FIG. I and include a vehicle 1, tachometer 2, gyroscope 3, power source 4, amplifiers 5, and chart recorder 6. The gyroscope, amplifier, and recorder are mounted on a base 9 convenient to the instrument operator 8. The tachometer 2 is positioned such that the vehicle operator 7 can maintain a pre-determined constant speed of the vehicle.

The vehicle 1 is a four-wheel drive type to negotiate roads of extreme roughness; additionally a stiff suspension is necessary to reduce indicator and/or recorder fluctuations due to suspension travel. An alternative to the vehicle described is a trailer-type vehicle towed by a powered vehicle with the instruments placed on the trailer.

The tachometer 2 is necessary to permit the vehicle operator to move the vehicle at a pre-determined velocity which can be calculated from the gear ratio of the vehicle; alternatively, an accurate speedometer can be substituted.

In FIG. II, the gyroscope with position-sensing electronic devices 22, 23 is illustrated; the gyroscope is required to hold a reference plane for the measurement. The gimbles of the gyroscope 17, 18 are arranged so that the axis of the gyroscope 24 can be caged in a vertical position. This facilitates measurement of pitch and roll without being affected by yaw (the vehicle motion when negotiating a turn). Level bubbles 20, 21 are on the gyroscope housing or frame 16. The gyroscope is positioned by means of a flexible mounting 15 between the base 14 and frame so that the bubbles indicate the vertical position of the gyroscope spindle 24 when the gyroscope is caged.

FIG. III illustrates the electrical assembly of the invention. A power supply such as a battery or pressurized fluid is required to run the gyroscope although these are not exclusive sources. The power supply 34 shown converts battery power to the three-phase alternating current necessary to operate the three-phase gyroscope 35. Two signals from the gyroscope, one for pitch 36 and one for roll 37 go to the respective bridges 43, 44 which limit electronic noise. From the bridges the signal goes to the respective amplifiers 38, 39 where it is amplified to be compatible with the recorder or indicator; a recorder or indicator that is sufficiently sensitive and adjustable would not require an amplifier. After amplification electronic noise filters 40, 41 clean the signal sufficiently to give a sharp line on the recording chart.

The chart recorder or indicator records or gives a reading of the road roughness. The recorder has the capability of scribing a line for pitch and one for roll. The roughness of the road is indicated by the deviation of the scribed lines from a reference setting for each. The two reference settings are made by adjusting the recorder to a particular position on the chart while the vehicle is motionless on a neutral portion of the road to be tested.

For absolute measurements, a test road with known deviations is required for calibration of the instrument. To calibrate the instrument, a test road with deviations of similar range as the actual road to be tested is prepared. A test run is made over the prepared road surface and calibration adjustments are made with the adjustable amplifiers so that the pre-determined readings are obtained. The vehicle is run over the test road section at the same velocity that will be used for measurements. The slowest velocity feasible is most desirable to reduce discrepancies caused by suspension travel.

In operation the invention works as follows. When one wheel of the vehicle contacts an irregularity in the road, it will move up or down. This in turn will move the body of the vehicle and the gyroscope housing which is rigidly attached to the vehicle body. The angular motion of the vehicle body from the reference plane held by the gyroscope will be sensed by the electronic pickups between the gyroscope gimbles and the gyroscope housing or support. This signal will be recorded on the chart or indicator. If both front wheels encounter a given deviation at the same time, this will produce pitch that will be recorded on the chart; the same is true for both rear wheels. Both wheels on a side encountering deviations of equal magnitude and direction will produce roll that is recorded on the chart or shown by the indicator. Ordinarily a road will produce both roll and pitch so two channels on the recording chart are necessary.

From the chart produced by the device, the following road roughness characteristics can be determined:

a. that portion of the road roughness that will cause pitch in a vehicle;
b. that portion of the road roughness that will cause roll in a vehicle;
c. those surface deviations that will cause both pitch and roll;
d. the amplitude and frequency of road surface deviations;
e. the grade of the road or terrain over which the vehicle travels;
f. the side-slope of the road or terrain over which the vehicle travels;
g. with proper calibration, absolute deviations of the road or terrain over which the vehicle travels.

The data collected by use of this invention would be of great value in at least two areas: road design and research and road maintenance. In research a method of compiling meaningful quantitative description of road roughness does not exist at this time— only subjective, qualitative descriptions can be given for road roughness of unpaved roads; consequently, road performance cannot be communicated with any degree of accuracy. Thus, an improved procedure for building or handling unpaved roads may remain only a matter of opinion unless the results are truly exceptional. Data from this invention would provide an objective, quantitative record of road performance that would be easily and readily communicable and evaluated.

In the area of road maintenance, with quantitative data, a minimum acceptable standard for roads could be established and then any time the data indicated that the performance of a road or portion of a road was approaching the standard or already below it, repairs could be begun. The ability to constantly monitor road performance would greatly facilitate maintenance planning by allowing those responsible for maintenance to accurately forecast the nature, extent and location of future repair work. This ability to plan would also allow more efficient use of maintenance equipment and personnel as well as allowing for preparation of alternate routes to be used while repairs are made. This type of use would be of particular importance in logging operations over unpaved roads.

Having thus described our invention, we claim:

1. A road roughness analyzer comprised of a three-phase, signal-producing gyroscope, said gyroscope fixed in a mounting frame, between which gyroscope and mounting frame are sensors to detect and transmit signal variations of the gyroscope occurring when the relative attitudes of said gyroscope and said mounting frame change, which signals are related to the relative attitudes of said gyroscope and said mounting frame, said mounting frame rigidly secured to the body of a stiff-suspensioned, four-wheeled vehicle, said vehicle containing a velocity monitoring device for aid in maintaining a constant, predetermined speed, said vehicle also containing appropriate electrical circuitry for processing said gyroscope signals, said processed signals actuating a suitable recordation device, said recordation device also contained in said vehicle.

2. A method for analyzing road surface roughness, which method consists of the following steps, not necessarily in sequence:
   a. generation of data from a control surface, which data are obtained by movement over said control surface at a predetermined uniform speed of a device for sensing and recording surface deviations;
   b. generation of data from the surface to be analyzed, which data are obtained by movement over said surface at the same predetermined uniform speed used in step (a) of a device for sensing and recording surface deviations; finally,
   c. comparison of the data generated in step (a) to that generated in step (b), which comparison provides an objective quantitative and qualitative evaluation of the road surface analyzed.

* * * * *